Patented July 19, 1932

1,867,880

UNITED STATES PATENT OFFICE

JAMES BARRET CROCKETT, OF CAMBRIDGE, MASSACHUSETTS, ASSIGNOR TO CAMBRIDGE RUBBER COMPANY, OF CAMBRIDGE, MASSACHUSETTS, A CORPORATION OF MASSACHUSETTS

MANUFACTURE OF RUBBER FOOTWEAR

No Drawing.   Application filed May 14, 1929.   Serial No. 363,095.

This invention relates to improvements in rubber footwear and processes of manufacturing the same, and, with regard to certain more specific features thereof, to the production of a rubber boot or shoe having a tread portion of rubber crepe or other wear-resisting sheet material assembled with a rubber body by an improved process of manufacture.

One of the objects of the present invention is to provide an improved and economical method of forming a specially soled shoe or similar article of footwear at low cost, to produce such article mainly by a series of dipping operations and to produce a dipped shoe of improved appearance and having shape-retaining and wear-resisting qualities.

Another object involves the pre-vulcanization of rubber latex and the use of same in aqueous and substantially uncoagulated condition as a bath into which a shoe last or suitable former may be dipped after associating therewith a sheet of tread material such as natural plantation crepe or parts cut from vulcanized compounded rubber sheet, leather or similar materials or compositions having the desired physical and wearing properties; so as to coat the last and assembled tread portion by deposit of the vulcanized rubber latex and build up a shoe body having securely united therewith the tread or sole portion of suitable material.

The process is particularly advantageous for use in factories not equipped with the usual heavy rubber machinery, for instance, leather shoe factories, and provides a means for making shoes by the use of simple and inexpensive equipment and from materials purchasable in the open market.

Preferably the process consists in dipping an appropriate former into pre-vulcanized rubber latex although the invention in certain of its aspects may involve only the use of natural rubber latex or the same in concentrated, purified, thickened or stabilized form containing vulcanizing ingredients. To carry out certain features of the invention, aqueous dispersions of previously coagulated or reclaimed rubber artificially obtained by mechanical and/or chemical means may also be employed where their properties permit and in either a vulcanized or unvulcanized condition. Where using unvulcanized material the step of vulcanization will, of course, be brought in at an appropriate stage. There is first associated with the former a tread portion or sole or in some cases merely a heel or other desired exterior reinforcement of sheet material, this association being of a temporary character. Thereafter, the former with assembled reinforcing piece or pieces of sheet material is dipped repeatedly into the aqueous rubber containing material to build up a body by the deposit of the rubber containing material on the former. The finished article is then dried, stripped from the former and turned inside out, bringing the reinforcing sheet pieces originally associated with the former and therefore on the interior of the article, to a normal condition and position of use on the exterior of the article.

In further carrying out the process, pieces of either woven or knitted fabric of similar material may be pressed onto the exterior coating on the former before the same is dried, stripped and turned inside out. With this additional step, a highly finished rubber shoe is provided, having a body of dried rubber latex, a sole of crepe rubber or other wear-resisting material and an insole or lining of fabric.

The former used in carrying out the process may have grooves, recesses, figures or designs cut, molded, sunk in or raised, or attached to its surface as described in my co-pending application Serial No. 363,098, filed May 14, 1929, and, in this invent, a fully trimmed, reinforced, ornamented and completed article will be obtained by the method herein described.

The pre-vulcanized latex referred to is such as described in U. S. Patents Nos. 1,443,149, dated January 23, 1923, and 1,682,857, dated September 4, 1928. Such pre-vulcanized latex compounded or not with fillers, pigments, dyes or like material, may be obtained in stabilized form in the most suitable concentration, viscosity and degree of cure for forming the body in the minimum number of dips and no step of vulcanization is required after the article is formed. The properties of the rubber deposited from such pre-vulcanized rubber are of the highest order.

The dipping operation may be carried out by hand or by mechanical means as will be well understood by those skilled in the art.

The sole, heel and the trimming or reinforcing parts if temporarily applied to the last and dipped into the aqueous rubber containing material will not require an adhesive. The first and last dipped coats of the body may be of different colors to produce a contrast between the inside and outside of the shoe.

What I claim is:—

1. The process of making an article of rubber footwear which consists in temporarily applying a sheet of natural rubber crepe or other tread material to a former, dipping the former into vulcanized rubber latex to deposit a coating of the vulcanized rubber latex over the former and assembled tread material, drying the resultant product, removing from the former and turning inside out to bring the tread material into proper position.

2. The process of making an article of rubber footwear which consists in temporarily applying a sheet of natural rubber crepe or other tread material to a former, dipping the former into vulcanized rubber latex to deposit a coating of the vulcanized rubber latex over the former and assembled tread material, applying a sheet of fabric or other lining material to the exterior of the coating, drying the resultant product, removing same from the last and turning the same inside out to properly position the tread portion on the exterior and the lining portion on the interior of the shoe.

3. The process of making an article of rubber footwear which consists in temporarily applying a sheet of natural rubber crepe or other tread material to a former, dipping the former into an aqueous rubber containing material to deposit a coating of the aqueous rubber containing material over the former and assembled tread material, applying a sheet of fabric or other lining material to the exterior of the coating, drying the resultant product, removing the same from the last and turning the same inside out to properly position the tread portion on the exterior and the lining portion on the interior of the shoe.

JAMES BARRET CROCKETT.